US012732631B2

(12) United States Patent
Xiu et al.

(10) Patent No.: US 12,732,631 B2
(45) **Date of Patent: *Sep. 8, 2026**

(54) CONSTRAINED AND ADJUSTED APPLICATIONS OF COMBINED INTER- AND INTRA-PREDICTION MODE

(71) Applicant: BEIJING DAJIA INTERNET INFORMATION TECHNOLOGY CO., LTD., Beijing (CN)

(72) Inventors: Xiaoyu Xiu, San Diego, CA (US); Yi-Wen Chen, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/948,237

(22) Filed: Nov. 14, 2024

(65) Prior Publication Data

US 2025/0071312 A1 Feb. 27, 2025

Related U.S. Application Data

(63) Continuation of application No. 17/472,363, filed on Sep. 10, 2021, now Pat. No. 12,177,467, which is a (Continued)

(51) Int. Cl.
*H04N 19/50* (2014.01)
*H04N 19/105* (2014.01)
*H04N 19/176* (2014.01)

(52) U.S. Cl.
CPC .......... *H04N 19/50* (2014.11); *H04N 19/105* (2014.11); *H04N 19/176* (2014.11)

(58) Field of Classification Search
CPC ..... H04N 19/176; H04N 19/105; H04N 19/50
See application file for complete search history.

(56) References Cited

U.S. PATENT DOCUMENTS

2017/0094305 A1 3/2017 Li et al.
2018/0192071 A1 7/2018 Chuang et al.
(Continued)

FOREIGN PATENT DOCUMENTS

CN 103765892 A 4/2014
CN 105493505 A 4/2016
(Continued)

OTHER PUBLICATIONS

The second EPOA issued in EP Application No. 20769288.0 dated Apr. 10, 2025, (7p).
(Continued)

*Primary Examiner* — On S Mung
(74) *Attorney, Agent, or Firm* — Arch & Lake LLP; Hao Tan; Shen Wang

(57) ABSTRACT

A method of video encoding is provided. The method includes obtaining, by an encoder, a first reference picture and a second reference picture associated with a current block, wherein the first reference picture is before a current picture and the second reference picture is after the current picture in display order. The method further includes determining, by the encoder, whether to apply a decoder-side motion vector refinement (DMVR) operation based on a combined inter and intra prediction (CIIP) flag for the current block. The method further includes determining, by the encoder, whether to apply a bi-directional optical flow (BDOF) operation based on the CIIP flag. The method further includes calculating, by the encoder, a prediction of the current block based on the determinations as to whether to apply the DMVR and BDOF operations.

11 Claims, 11 Drawing Sheets

Related U.S. Application Data continuation of application No. PCT/US2020/022491, filed on Mar. 12, 2020.

(60) Provisional application No. 62/817,503, filed on Mar. 12, 2019.

(56) References Cited

U.S. PATENT DOCUMENTS

| | | | |
|---|---|---|---|
| 2018/0199057 | A1 | 7/2018 | Chuang et al. |
| 2019/0014342 | A1 | 1/2019 | Li et al. |
| 2022/0224911 | A1 | 7/2022 | Park et al. |

FOREIGN PATENT DOCUMENTS

| | | | |
|---|---|---|---|
| CN | 108028929 | A | 5/2018 |
| CN | 108353184 | A | 7/2018 |
| CN | 108370441 | A | 8/2018 |
| CN | 108781294 | A | 11/2018 |
| CN | 113574891 | A | 10/2021 |
| EP | 3913921 | A1 | 11/2021 |
| KR | 10-20180107761 | A | 10/2018 |
| KR | 102501210 | B1 | 2/2023 |
| WO | 2020098643 | A1 | 5/2020 |
| WO | 2020184487 | A1 | 9/2020 |

OTHER PUBLICATIONS

The Hearing Notice issued in IN Application No. 202147041518 dated Mar. 25, 2025, (2p).

The first Office Action issued in MX Application No. MX/a/2021/011043 dated Feb. 21, 2025 with English translation, (7p).

The first Office Action issued in VN Application No. 1-2023-08504 dated Mar. 31, 2025 with English translation, (3p).

KROA issued in Application No. 10-2023-7005280 dated Jul. 7, 2025 with English translation, (8p).

International Search Report and Written Opinion of PCT Application No. PCT/CN2020/022491 dated Jul. 2, 2020, (3p).

Bross, Benjamin et al., "Versatile Video Coding (Draft 4)", JVET-M1001-v7, Joint Video Experts Team (JVET) of ITU-T SG 16 WP 3 and ISO/IEC JTC 1/SC 29/WG 11, 13th Meeting: Marrakech, MA, Mar. 9, 2019, (300p).

Poirier, T. et al., "CE-10 Related Multi-Hypothesis With Uni-Directional Inter Prediction Restriction", JVET-M0390, Joint Video Experts Team (JVET) of ITU-T SG 16 WP 3 and ISO/IEC JTC 1/SC 29/WG 11, 13th Meeting: Marrakech, MA, Jan. 10, 2019, (5p).

First Office Action issued for corresponding Japanese Patent Application 2022-097598 mailed on Aug. 22, 2023, (5p).

First Office Action issued on Sep. 1, 2023 for counterpart Chinese patent application No. 202111463421.4, (8p).

Search report issued on Sep. 1, 2023 for counterpart Chinese patent application No. 202111463421.4, (5p).

Extended Search Report issued on Nov. 18, 202 for counterpart European Patent Application No. 20769288.0, (7p).

Office Action issued on Nov. 30, 2022 for counterpart European Patent Application No. 20769288.0, (11p ).

Examination Report issued on Sep. 20, 2022 for counterpart Indian Patent Application No. 202147041518, (6p).

Chen, Jianle et al., "Algorithm description for Versatile Video Coding and Test Model 4 (VTM4)", JVET-M1002-v1, Joint Video Experts Team (JVET) of ITU-T SG 16 WP 3 and ISO/IEC JTC 1/SC 29/WG11, 13th Meeting: Marrakech, MA, Jan. 9-18, 2019, (60p).

Karczewicz, Marta et al., "JVET AHG report: Tool evaluation (AHG1)", Joint Video Exploration Team (JVET) of ITU-T SG 16 WP 3 and ISO/IEC JTC 1/SC 29/WG 11, Document: JVET-G0001, 7th Meeting: Torino, IT, Jul. 13-21, 2017, (7p).

Xiu, Xiaoyu, et al., "CE10-related: Simplification on combined inter and intra prediction (CIIP)", Joint Video Experts Team (JVET) of ITU-T SG 16 WP 3 and ISO/IEC JTC 1/SC 29/WG 11, JVET-N0327, 14th Meeting: Geneva, CH, Mar. 19-27, 2019, (3p).

Chen, Chun-Chia et al., "CE4-related: Reduction of interactions between bi-prediction coding tools", Joint Video Experts Team (JVET) of ITU-T SG 16 WP 3 and ISO/IEC JTC 1/SC 29/WG 11, JVET-N0086-v1, 14th Meeting: Geneva, CH, Mar. 19-27, 2019, (5p).

Huawei Technologies. Co., Ltd, Weiwei Xu et al.; "CE10: Simplification on Combined Inter-Intra Prediction (test 10.1.3)", Joint Video Experts Team (JVET) of ITU-T SG 16 WP 3 and ISO/IEC JTC 1/SC 29/WG 1, 13th Meeting: Marrakech, MA, Jan. 9-18, 2019, Document: JVET-0290, (4p).

First Office Action of Korean Application No. 10-2021-7029039 dated Jul. 13, 2022 with English translation, (8p).

Benjamin Bross et al., "Versatile Video Coding (Draft 4)", Joint Video Experts Team (JVET) of ITU-T SG 16 WP 3 and ISO/IEC JTC 1/SC 29/WG 1 13th Meeting: Marrakech, MA, Jan. 9-18, 2019, Document: JVET-M1001-v6, (299p).

First Office Action issued for Japanese Patent Application 2022-097598 dated on Apr. 25, 2023, with English translation, (3p).

CN Search report in Application No. 2025101399002 dated Mar. 12, 2026 with English translation, (5p).

VNOA issued in Application No. 1-2023-08505 dated Mar. 5, 2026 with English translation, (4p).

T.Poirier et al., "CE-10 related multi-hypothesis with uni-directional inter prediction restriction", Joint Video Experts Team (JVET) of ITU-T SG 16 WP 3 and ISO/IEC JTC 1/SC 29/WG 11, JVET-M0390, 13th Meeting: Marrakech, MA, Jan. 9-18, 2019, (5p).

Benjamin Bross et al, "Versatile Video Coding (Draft 4)", Joint Video Experts Team (JVET) of ITU-T SG 16 WP 3 and ISO/IEC JTC 1/SC 29/WG 11, JVET-M1001-v7, 13th Meeting: Marrakech, MA, Jan. 9-18, 2019, (300p).

CONSTRAINED AND ADJUSTED APPLICATIONS OF COMBINED INTER- AND INTRA-PREDICTION MODE

CROSS-REFERENCE TO RELATED APPLICATIONS

This application is a continuation application of U.S. patent Applicant Ser. No. 17/472,363, filed on Sep. 10, 2021, which is a continuation of PCT Application PCT/US2020/022491 filed on Mar. 12, 2020, which is based upon and claims the benefit to U.S. provisional patent application Ser. No. 62/817,503 filed on Mar. 12, 2019, the entire disclosures of which are incorporated herein by reference in their entireties for all purposes.

FIELD

The present disclosure relates generally to video coding and compression. More specifically, this disclosure relates to systems and methods for performing video coding using constraints and adjustments on applications of Combined Inter- and Intra-Prediction (CIIP) mode.

BACKGROUND

This section provides background information related to the present disclosure. The information contained within this section should not necessarily be construed as prior art.

Any of various video coding techniques may be used to compress video data. Video coding can be performed according to one or more video coding standards. Some illustrative video coding standards include versatile video coding (VVC), joint exploration test model (JEM) coding, high-efficiency video coding (H.265/HEVC), advanced video coding (H.264/AVC), and moving picture experts group (MPEG) coding.

Video coding generally utilizes predictive methods (e.g., inter-prediction, intra-prediction, or the like) that take advantage of redundancy inherent in video images or sequences. One goal of video coding techniques is to compress video data into a form that uses a lower bit rate, while avoiding or minimizing degradations to video quality.

Predictive methods utilized in video coding typically include performing spatial (intra frame) prediction and/or temporal (inter frame) prediction to reduce or remove redundancy inherent in the video data, and are typically associated with block-based video coding.

SUMMARY

This section provides a general summary of the disclosure, and is not a comprehensive disclosure of its full scope or all of its features.

According to a first aspect of the present disclosure, some embodiments provide a method of video encoding. The method includes obtaining, by an encoder, a first reference picture and a second reference picture associated with a current block, wherein the first reference picture is before a current picture and the second reference picture is after the current picture in display order. The method further includes determining, by the encoder, whether to apply a decoder-side motion vector refinement (DMVR) operation based on a combined inter and intra prediction (CIIP) flag for the current block. The method further includes determining, by the encoder, whether to apply a bi-directional optical flow (BDOF) operation based on the CIIP flag. The method further includes calculating, by the encoder, a prediction of the current block based on the determinations as to whether to apply the DMVR and BDOF operations. When determining to apply the DMVR operation in response to the CIIP flag indicating that CIIP is not applied to the current block, the method further includes adjusting, by the encoder, a first motion vector MV0 and a second motion vector MV1 to generate an updated first prediction L0' and an updated second prediction L1'. The first motion vector MV0 is from the current block to a first reference block in the first reference picture. The second motion vector MV1 is from the current block to a second reference block in the second reference picture. Determining whether to apply the BDOF operation includes: determining to apply the BDOF operation in response to the CIIP flag indicating that the CIIP is not applied to the current block, and in response to determining to apply the BDOF operation, the method further includes calculating, by the encoder, first horizontal and vertical gradient values associated with the updated first prediction L0'; and calculating, by the encoder, second horizontal and vertical gradient values associated with the updated second prediction L1'.

According to a second aspect of the present disclosure, some embodiments provide a computing device. The computing device includes a storage medium; and one or more processors coupled to the storage medium. The one or more processors are configured to perform acts including obtaining a first reference picture and a second reference picture associated with a current block, wherein the first reference picture is before a current picture and the second reference picture is after the current picture in display order. The acts further includes determining whether to apply a decoder-side motion vector refinement (DMVR) operation based on a combined inter and intra prediction (CIIP) flag for the current block. The acts further include determining whether to apply a bidirectional optical flow (BDOF) operation based on the CIIP flag. The acts further include calculating a prediction of the current block based on the determinations as to whether to apply the DMVR and BDOF operations. When determining to apply the DMVR operation in response to the CIIP flag indicating that CIIP is not applied to the current block, the acts further include adjusting a first motion vector MV0 and a second motion vector MV1 to generate an updated first prediction L0' and an updated second prediction L1'. The first motion vector MV0 is from the current block to a reference block in the first reference picture. The second motion vector MV1 is from the current block to a reference block in the second reference picture. Determining whether to apply the BDOF operation includes: determining to apply the BDOF operation in response to the CIIP flag indicating that the CIIP is not applied to the current block, and in response to determining to apply the BDOF operation, the acts further include: calculating first horizontal and vertical gradient values associated with the updated first prediction L0'; and calculating second horizontal and vertical gradient values associated with the updated second prediction L1'.

According to a third aspect of the present disclosure, some embodiments provide a computer readable storage medium storing a bitstream generated by a method of video encoding. The method of video encoding includes obtaining a first reference picture and a second reference picture associated with a current block, wherein the first reference picture is before a current picture and the second reference picture is after the current picture in display order. The method further includes determining whether to apply a decoder-side motion vector refinement (DMVR) operation based on a combined inter and intra prediction (CIIP) flag for the current block. The method further includes determining whether to apply a bi-directional optical flow (BDOF) operation based on the CIIP flag. The method further includes calculating a prediction of the current block based on the determinations as to whether to apply the DMVR and BDOF operations. When determining to apply the DMVR operation in response to the CIIP flag indicating that CIIP is not applied to the current block, the method further includes adjusting a first motion vector MV0 and a second motion vector MV1 to generate an updated first prediction L0' and an updated second prediction L1'. The first motion vector MV0 is from the current block to a reference block in the first reference picture. The second motion vector MV1 is from the current block to a reference block in the second reference picture. Determining whether to apply the BDOF operation includes: determining to apply the BDOF operation in response to the CIIP flag indicating that the CIIP is not applied to the current block, and in response to determining to apply the BDOF operation, the method further includes: calculating first horizontal and vertical gradient values associated with the updated first prediction L0'; and calculating second horizontal and vertical gradient values associated with the updated second prediction L1'.

BRIEF DESCRIPTION OF THE DRAWINGS

Hereinafter, sets of illustrative, non-limiting embodiments of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different embodiments may, but need not, be combined with one another.

DETAILED DESCRIPTION

Figure 1:
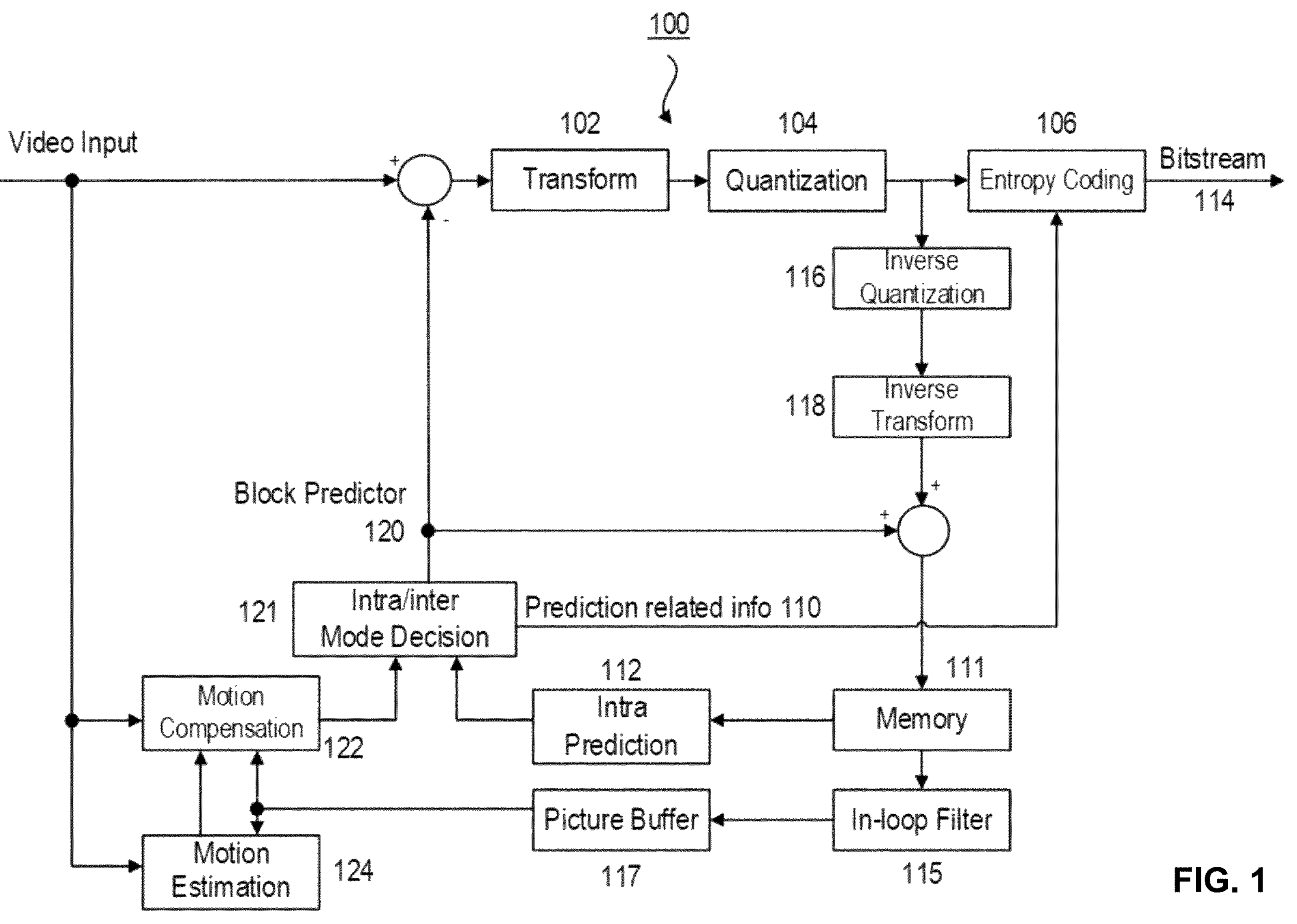
FIG. 1 is a block diagram setting forth an illustrative block-based hybrid video encoder which may be used in conjunction with many video coding standards.

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one embodiment," "an embodiment," "another embodiment," or the like in the singular or plural means that one or more particular features, structures, or characteristics described in connection with an embodiment are included in at least one embodiment of the present disclosure. Thus, the appearances of the phrases "in one embodiment" or "in an embodiment," "in another embodiment," or the like in the singular or plural in various places throughout this specification are not necessarily all referring to the same embodiment. Furthermore, the particular features, structures, or characteristics in one or more embodiments may be combined in any suitable manner.

Conceptually, many video coding standards are similar, including those previously mentioned in the Background section. For example, virtually all video coding standards use block-based processing, and share similar video coding block diagrams to achieve video compression.

In block-based video coding, the input video signal is processed block by block. For each block (also known as a coding unit (CU)), spatial prediction and/or temporal prediction may be performed.

Spatial prediction (also known as "intra prediction") uses pixels from the samples of already coded neighboring blocks (which are called reference samples) in the same video picture/slice to predict the current block. Spatial prediction reduces spatial redundancy inherent in the video signal.

Temporal prediction (also known as "inter prediction" or "motion compensated prediction") uses reconstructed pixels from the already coded video pictures to predict the current block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, when multiple reference pictures are supported, one reference picture index is additionally sent, which is used to identify from which reference picture in the reference picture store the temporal prediction signal comes.

After spatial and/or temporal prediction, the mode decision block in the encoder chooses the best prediction mode, for example based on the rate-distortion optimization method. The prediction block is then subtracted from the current block; and the prediction residual is de-correlated using transform and quantized. The quantized residual coefficients are inverse-quantized and inverse-transformed to form the reconstructed residual, which is then added back to the prediction block to form the reconstructed signal of the block.

After spatial and/or temporal predictions, further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

During the decoding process, the video bit-stream is first entropy decoded at entropy decoding unit. The coding mode and prediction information are sent to either the spatial prediction unit (when intra coded) or the temporal prediction unit (when inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

In many hybrid video coding schemes, each block may employ either inter or intra prediction method, but not both. Yet the residual signal generated by inter-predicted blocks and intra-predicted blocks could present very different characteristics from each other, therefore, if the two kinds of predictions can be combined in an efficient way, one more accurate prediction can be expected for reducing the energy of prediction residuals and therefore improving the coding efficiency. Additionally, in certain video contents, the motion of moving objects could be complicated. For example, there could exist areas which contain both old content (e.g., the objects that are included in previously coded pictures) and emerging new content (e.g., the objects that are excluded in previously coded pictures). In such scenarios, neither inter prediction or intra prediction can provide one accurate prediction of the current block.

To further improve the prediction efficiency, the now-current version of VVC introduces Combined Inter- and Intra-Prediction (CIIP) mode, which combines the intra prediction and the inter prediction of one CU that is coded by merge mode. The application of CIIP mode generally improves coding efficiency.

However, the application of the CIIP mode involves more operations than those involved in inter mode or intra mode, which tends to increase the computational complexity and reduce the encoding/decoding throughput.

Moreover, the now-current version of VVC is not fully consistent in its treatment of intra mode blocks and CIIP mode blocks within the context of constructing the Most Probable Mode (MPM) candidate list for their neighboring blocks.

FIG. 1 shows a block diagram of an illustrative block-based hybrid video encoder 100 which may be used in conjunction with many video coding standards. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

To improve coding efficiency and visual quality, an in-loop filter is commonly used. For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
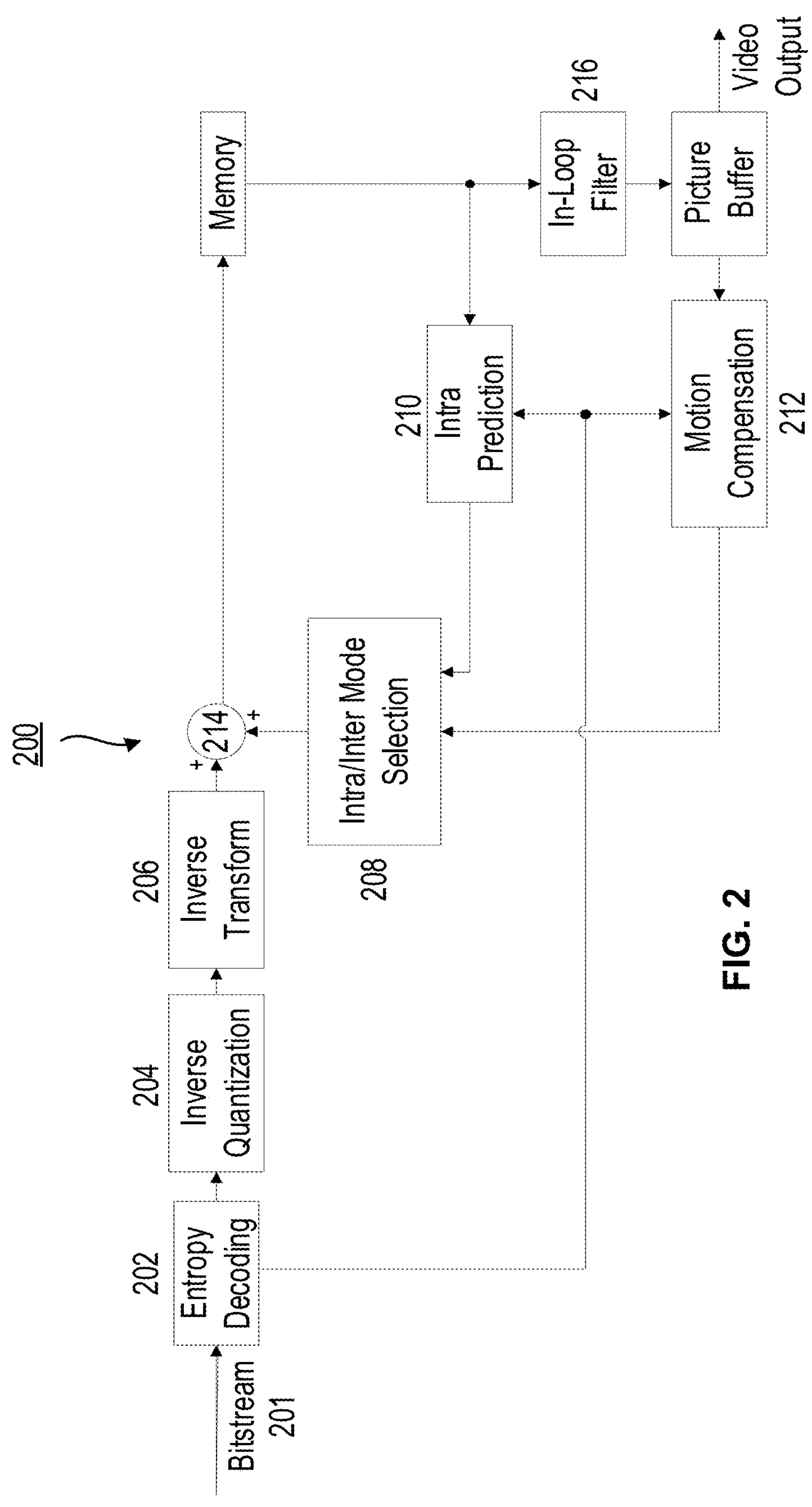
FIG. 2 is a block diagram setting forth an illustrative video decoder which may be used in conjunction with many video coding standards.

FIG. 2 is a block diagram setting forth an illustrative video decoder 200 which may be used in conjunction with many video coding standards. This decoder 200 is similar to the reconstruction-related section residing in the encoder 100 of FIG. 1. In the decoder 200 (FIG. 2), an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 208, is configured to perform either an Intra Prediction 210, or a Motion Compensation 212, based on decoded prediction information. A set of unfiltered reconstructed pixels are obtained by summing up the reconstructed prediction residual from the Inverse Transform 206 and a predictive output generated by the block predictor mechanism, using a Summer 214. In situations where an in-loop filter is turned on, a filtering operation is performed on these reconstructed pixels to derive the final reconstructed video. The reconstructed video in reference picture store is then sent out to drive a display device, as well as used to predict future video blocks.

In video coding standards such as HEVC, blocks may be partitioned based on quad-trees. In newer video coding standards such as the now-current VVC, more partition methods are employed, and one coding tree unit (CTU) may be split into CUs to adapt to varying local characteristics based on quad-tree, binary-tree or ternary-tree. The separation of CU, prediction unit (PU) and transform unit (TU) does not exist in most coding modes in the now-current VVC, and each CU is always used as the basic unit for both prediction and transform without further partitions. However, in some specific coding modes such as intra sub-partition coding mode, each CU may still contain multiple TUs. In the multi-type tree structure, one CTU is firstly partitioned by a quad-tree structure. Then, each quad-tree leaf node can be further partitioned by a binary and ternary tree structure.

Figures 3A, 3B, 3C, 3D, 3E:
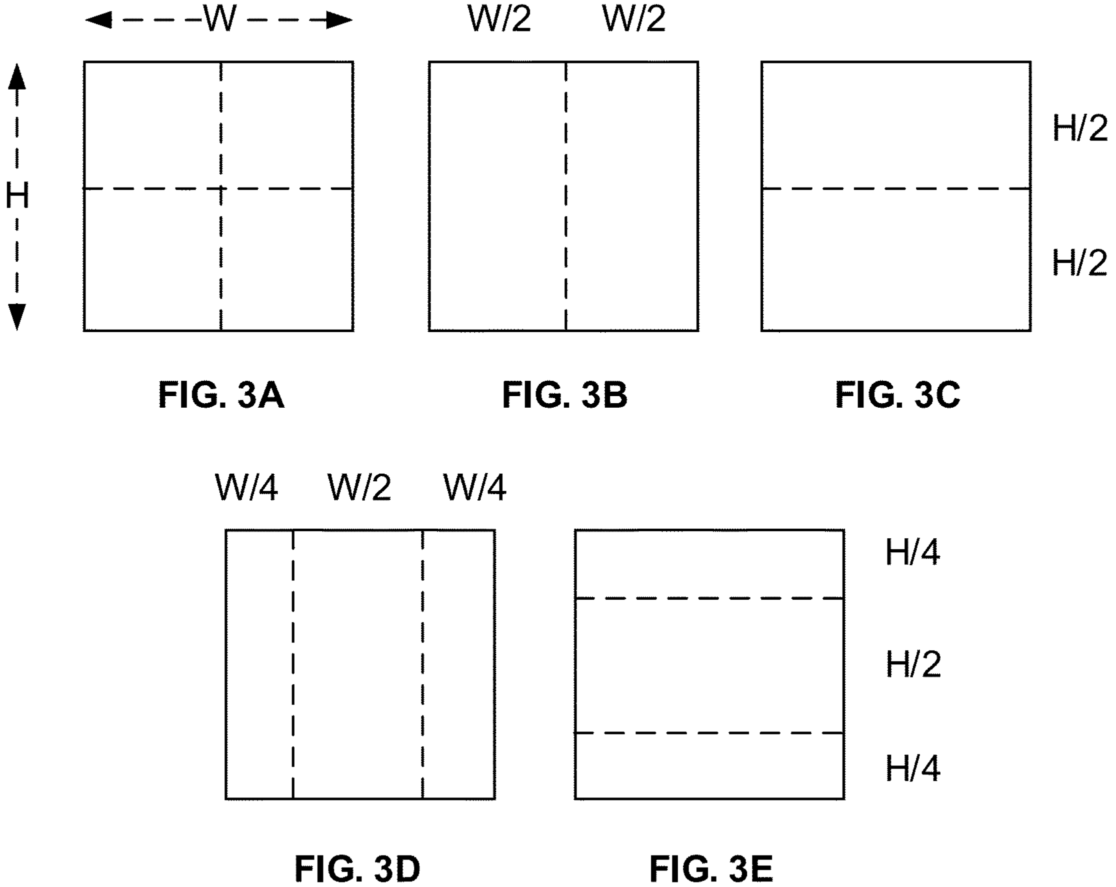
FIGS. 3A-3E show example splitting types, namely, quaternary partitioning (FIG. 3A), horizontal binary partitioning (FIG. 3B), vertical binary partitioning (FIG. 3C), horizontal ternary partitioning (FIG. 3D), and vertical ternary partitioning (FIG. 3E), according to example embodiments.

FIGS. 3A-3E shows five example splitting types, namely, quaternary partitioning (FIG. 3A), horizontal binary partitioning (FIG. 3B), vertical binary partitioning (FIG. 3C), horizontal ternary partitioning (FIG. 3D), and vertical ternary partitioning (FIG. 3E). In video coding standards such as HEVC and the now-current VVC, each CU may be intra-predicted or inter-predicted.

The now-current VVC also introduces the Combined Intra- and Inter-Prediction (CIIP) coding mode, under which the intra prediction and the inter prediction of one CU that is coded by merge mode are combined.

In CIIP mode, for each merge CU, one additional flag is signaled to indicate whether the CIIP is enabled for the current CU. For the luma component of the current CU, the CIIP supports four frequently used intra modes, namely, the planar, DC, horizontal and vertical modes. For the chroma components of the current CU, the DM mode, which means that the same intra mode of the luma component is reused, is always applied without extra signaling.

Moreover, in CIIP mode, for each merge CU, weighted averaging is applied to combine the inter prediction samples and the intra prediction samples of the current CU. Specifically, when planar or DC mode is selected, equal weight (i.e., 0.5) is applied. Otherwise (i.e., either horizontal or vertical mode is applied), the current CU is firstly split horizontally (for horizontal mode) or vertically (for vertical mode) into four equal-sized areas. Four weight sets, denoted as ($w\_intra_i$, $w\_inter_i$), will be applied to combine the inter and intra prediction samples in different areas, where i=0 and i=3 represent the areas that are closest and furthest to the reconstructed neighboring samples used for intra prediction. In the current CIIP design, a pre-defined set of values of weight sets are: ($w\_intra_0$, $w\_inter_0$)=(0.75, 0.25), ($w\_intra_1$, $w\_inter_1$)=(0.625, 0.375), ($w\_intra_2$, $w\_inter_2$)=(0.375, 0.625) and ($w\_intra_3$, $w\_inter_3$)=(0.25, 0.75).

Figure 4A:
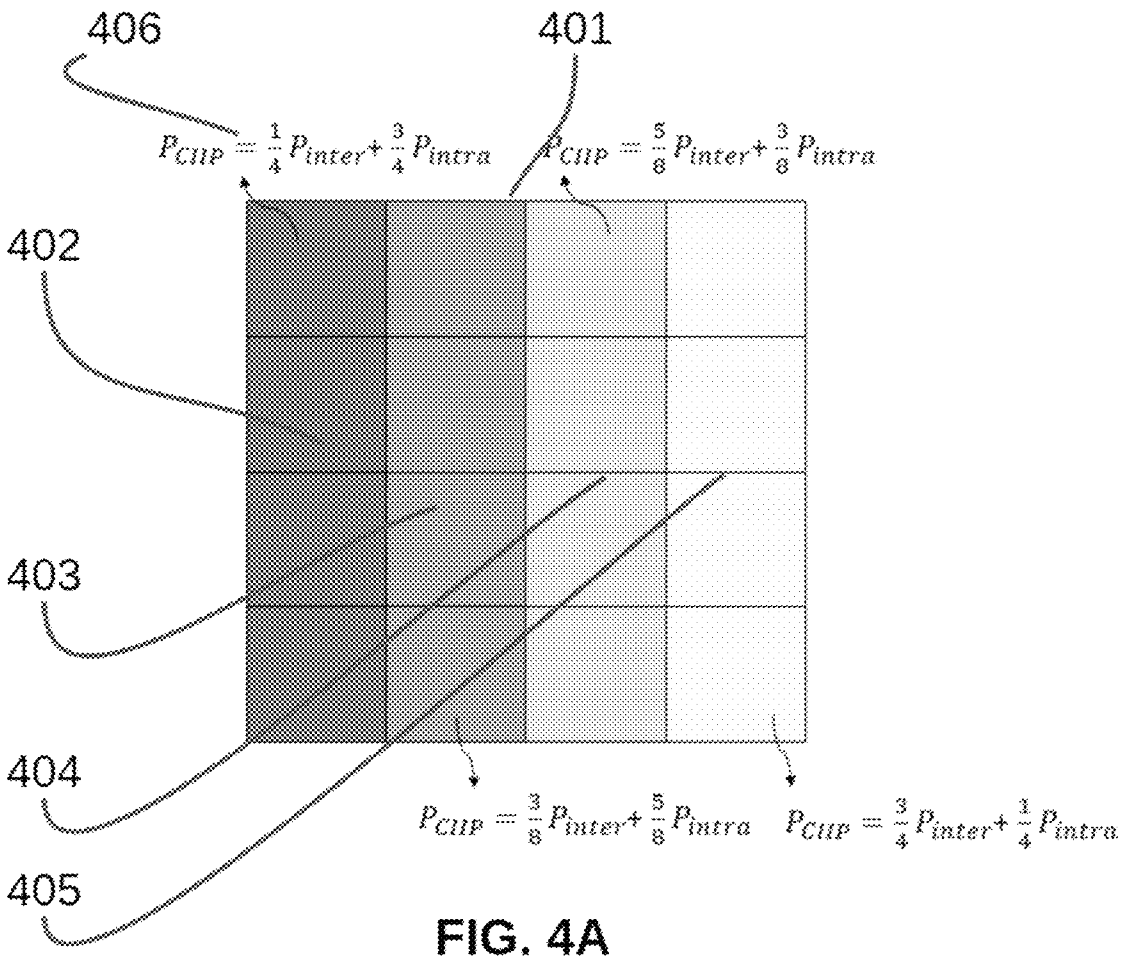
FIGS. 4A-4C are illustrations of combining inter and intra predictions in CIIP mode.
Figure 4B:
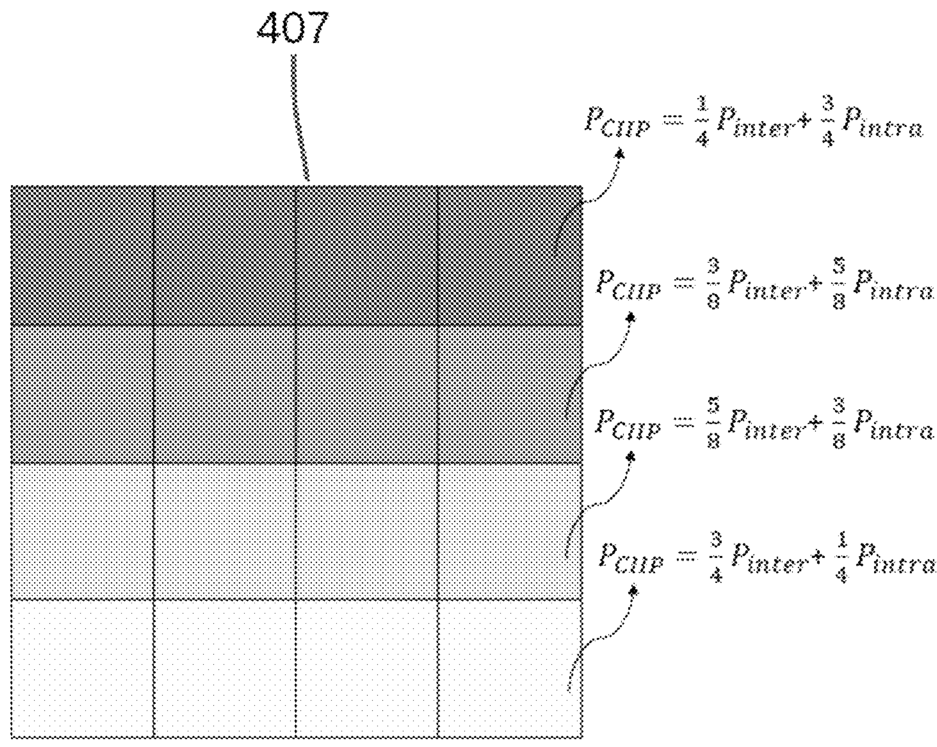
Figure 4C:
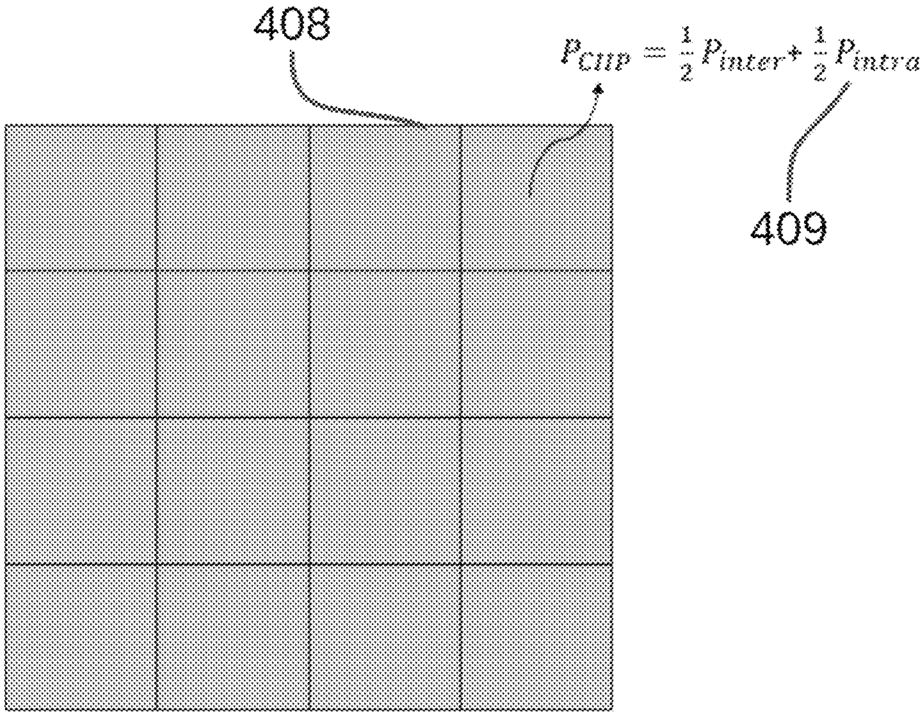

FIGS. 4A-4C are illustrations of combining inter and intra predictions in CIIP mode. In FIG. 4A, the operation of combination weights for a CU 401 in horizontal mode is illustrated. The current CU is split horizontally into four equal-sized areas 402, 403, 404 and 405, represented by four different grayscale shades. For each area, a weight set is applied to combine the inter and intra prediction samples. For example, for the area 402 to the extreme left, which is represented by the darkest grayscale shade, the weight set ($w\_intra_0$, $w\_inter_0$)=(0.75, 0.25) is applied, which means that the CIIP prediction is obtained as the sum of (i) 0.75 or ¾ times the intra prediction and (ii) 0.25 or ¼ times the inter prediction. This is also illustrated through the formula 406

$$P_{CIIP} = \frac{1}{4}P_{inter} + \frac{3}{4}P_{intra}$$

attached to the same area 402 with an arrow. The weight sets used for the other three areas 403, 404 and 405 are similarly illustrated. In FIG. 4B, the operation of combination weights for a CU 407 in vertical mode is illustrated in a similar way to FIG. 4A. In FIG. 4C, the operation of combination weights for a CU 408 in planar or DC mode is illustrated, where only one weight set, the set of equal weights, is applied for the whole CU 408, which is also illustrated through the formula 409

$$P_{CIIP} = \frac{1}{2}P_{inter} + \frac{1}{2}P_{intra}$$

attached to the whole CU 408 with an arrow.

The now-current VVC working specification also provides for the use of the intra mode of one CIIP CU as a predictor to predict the intra mode of its neighboring CIIP CUs through most probable mode (MPM) mechanism, but not for the use of the same intra mode of the same CIIP CU as a predictor to predict the intra mode of its neighboring intra-coded CUs through MPM mechanism.

Specifically, for each CIIP CU, if some of its neighboring blocks are also CIIP CUs, the intra modes of those neighbors are firstly rounded to the closest mode within planar, DC, horizontal and vertical modes and then added into the MPM candidate list of the current CU, i.e., the intra mode of one CIIP CU is allowed to predict the intra modes of its neighboring CIIP CUs. However, for each intra CU, if some of its neighboring blocks are coded by CIIP mode, these neighboring blocks are regarded as unavailable, i.e., the intra mode of one CIIP CU is disallowed to predict the intra modes of its neighboring intra CUs.

Figures 5A, 5B:
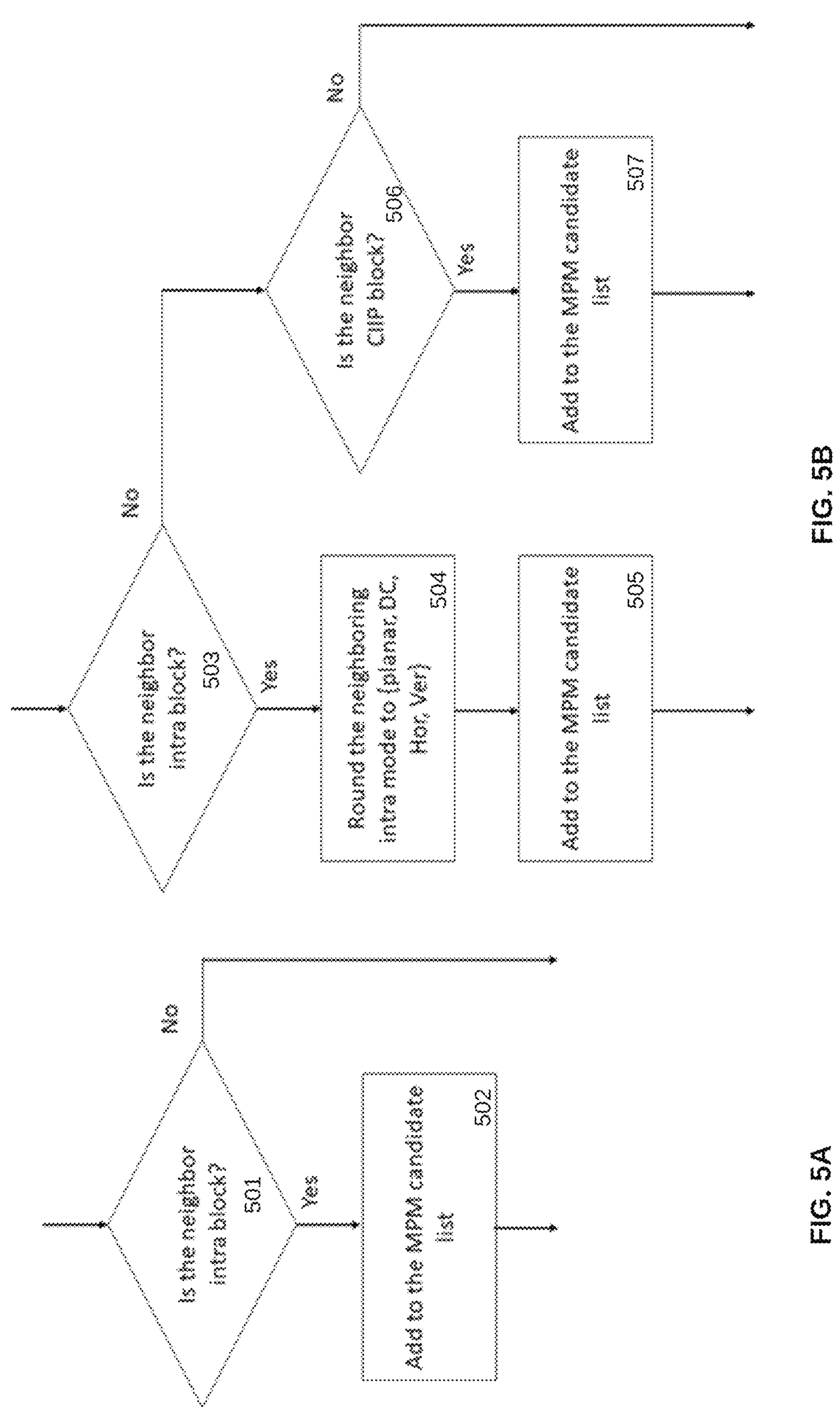
FIGS. 5A-5B constitute a pair of flow charts setting forth an illustrative generation process for an MPM candidate list in the now-current VVC.

FIGS. 5A-5B constitute a pair of flow charts setting forth an illustrative generation process for an MPM candidate list in the now-current VVC. FIG. 5A illustrates the generation process where the current CU is an intra block. In this case, a determination is made regarding whether a neighboring CU is an intra block (501), and when and only when it is an intra block, the intra mode of the neighboring CU is added to the MPM candidate list (502). FIG. 5B illustrates the generation process where the current CU is an intra block. In this case, a determination is made regarding whether a neighboring CU is an intra block (503), and when it is an intra block, the intra mode of the neighboring CU is rounded (504) and then added to the MPM candidate list (505), on the one hand, when it is not an intra block, a subsequent determination is made regarding whether the neighboring CU is a CIIP block (506), and when it is a CIIP block, the intra mode of the neighboring CU is added to the MPM candidate list (507).

FIGS. 5A-5B illustrate the discrepancy between the use of CIIP block and intra blocks in the generation process for a MPF candidate list in the now-current VVC, namely, the method of using a neighboring CIIP block in the generation process for MPM candidate list depends on whether the current block is an intra block or a CIIP block, and differs in the two cases.

In newer video coding standards such as the now-current VVC, new inter-mode coding tools have been introduced, and two examples of the new inter-mode coding tools are:

Bi-Directional Optical Flow (BDOF) and Decoder-side Motion Vector Refinement (DMVR).

Conventional bi-prediction in video coding is a simple combination of two temporal prediction blocks obtained from the reference pictures that are already reconstructed. However, due to the limitation of the block-based motion compensation, there could be remaining small motion that can be observed between the samples of two prediction blocks, thus reducing the efficiency of motion compensated prediction. To solve this problem, BDOF is applied in the now-current VVC to lower the impacts of such motion for every sample inside one block.

The BDOF is sample-wise motion refinement that is performed on top of the block-based motion-compensated predictions when bi-prediction is used. The motion refinement of each 4×4 sub-block is calculated by minimizing the difference between reference picture list 0 (L0) and reference picture list 1 (L1) prediction samples after the BDOF is applied inside one 6×6 window around the sub-block. Based on the motion refinement so derived, the final bi-prediction samples of the CU are calculated by interpolating the L0/L1 prediction samples along the motion trajectory based on the optical flow model.

DMVR is a bi-prediction technique for merge blocks with two initially signaled MVs that can be further refined by using bilateral matching prediction. The bilateral matching is used to derive motion information of the current CU by finding the closest match between two blocks along the motion trajectory of the current CU in two different reference pictures. The cost function used in the matching process is row-subsampled sum of absolute difference (SAD). After the matching process is done, the refined MVs are used for motion compensation in the prediction stage, boundary strength calculation in deblock filter, temporal motion vector prediction for subsequent pictures and cross-CTU spatial motion vector prediction for subsequent CUs. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

In the now-current VVC, BDOF and DMVR may both be used in conjunction with the CIIP mode.

Figure 6:
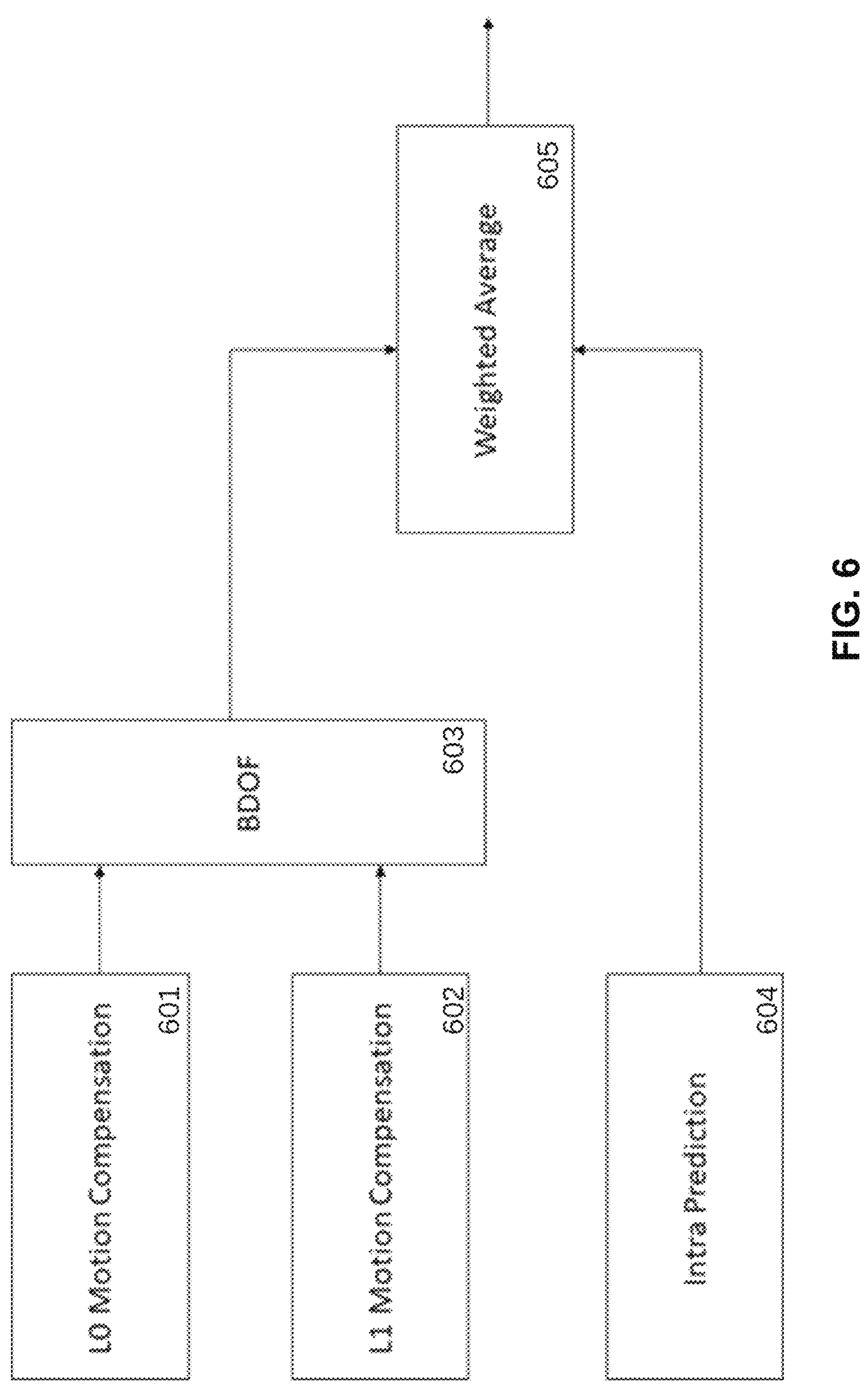
FIG. 6 is a flow chart setting forth an illustrative workflow of a CIIP design using Bi-Directional Optical Flow (BDOF) in the now-current VVC.

FIG. 6 is a flow chart setting forth an illustrative workflow of a CIIP design using Bi-Directional Optical Flow (BDOF) in the now-current VVC. In this workflow, L0 and L1 motion compensations (601 and 602) are processed through BDOF (603), and the output from BDOF is then processed together with the intra prediction (604) to form the weighted average (605) in CIIP mode.

The now-current VVC also provides for similar application of DMVR in conjunction with the CIIP mode.

In the now-current VVC, CIIP mode can enhance the efficiency of the motion compensated prediction. However, the present disclosure has identified three issues present in the now-current CIIP design contained in the now-current VVC.

First, because the CIIP combines the samples of inter and intra prediction, each CIIP CU needs to use its reconstructed neighboring samples to generate the prediction signal. This means that the decoding of one CIIP CU is dependent on the full reconstruction of its neighboring blocks. Due to such interdependency, for practical hardware implementations, CIIP needs to be performed in the reconstruction stage where neighboring reconstructed samples become available for intra prediction. Because the decoding of the CUs in the reconstruction stage must be performed sequentially (i.e., one by one), the number of computational operations (e.g., multiplications, additions and bit-shifts) involved in the CIIP process cannot be too high in order to ensure enough throughput of real-time decoding. Moreover, in the now-current CIIP design in the now-current VVC, new inter-mode coding tools such as BDOF and DMVR are also involved to generate the inter prediction samples for the CIIP mode. Given the additional complexity introduced by the new inter-mode coding tools, such design could severely lower the encoding/decoding throughput of hardware codec when the CIIP is enabled.

Second, in the now-current CIIP design in the now-current VVC, when one CIIP CU refers to one merge candidate that is bi-predicted, both the motion compensated prediction signals in list L0 and L1 need to be generated. When one or more MVs are not in integer precision, additional interpolation processes must be invoked to interpolate the samples at fractional sample positions. Such process not only increase the computational complexity but also increase the memory bandwidth given that more reference samples need to be accessed from external memory, and consequently also could severely lower the encoding/decoding throughput of hardware codec when the CIIP is enabled.

Third, in the now-current CIIP design in the now-current VVC, the intra modes of CIIP CUs and the intra modes of intra CUs are treated differently when constructing the MPM list of their neighboring blocks. Specifically, when one current CU is coded by CIIP mode, its neighboring CIIP CUs are regarded as intra, i.e., the intra modes of the neighboring CIIP CUS can be added into the MPM candidate list. However, when the current CU is coded by intra mode, its neighboring CIIP CUs are regarded as inter, i.e., the intra modes of the neighboring CIIP CUs are excluded from the MPM candidate list. Such non-unified design may not be optimal for the final version of the VVC standard.

The present disclosure proposes constrained and adjusted application of CIIP mode to address the three issues above.

According to the present disclosure, after identifying CUs that are candidates for the application of CIIP mode, a determination will be made regarding whether a CU identified as a candidate for the application of CIIP mode is bi-predicted or uni-predicted, and then based on the determination, the application of CIIP mode on the CU will be constrained.

According to an embodiment of the present disclosure, the constraining of the application of CIIP mode on the CU based on the determination comprises disabling the operation of one or more pre-defined inter-prediction techniques in the generation of the inter-prediction samples during the application of CIIP mode on the CU when the CU is bi-predicted.

In one example, the one or more pre-defined inter-prediction techniques comprises BDOF and DMVR.

Figure 7:
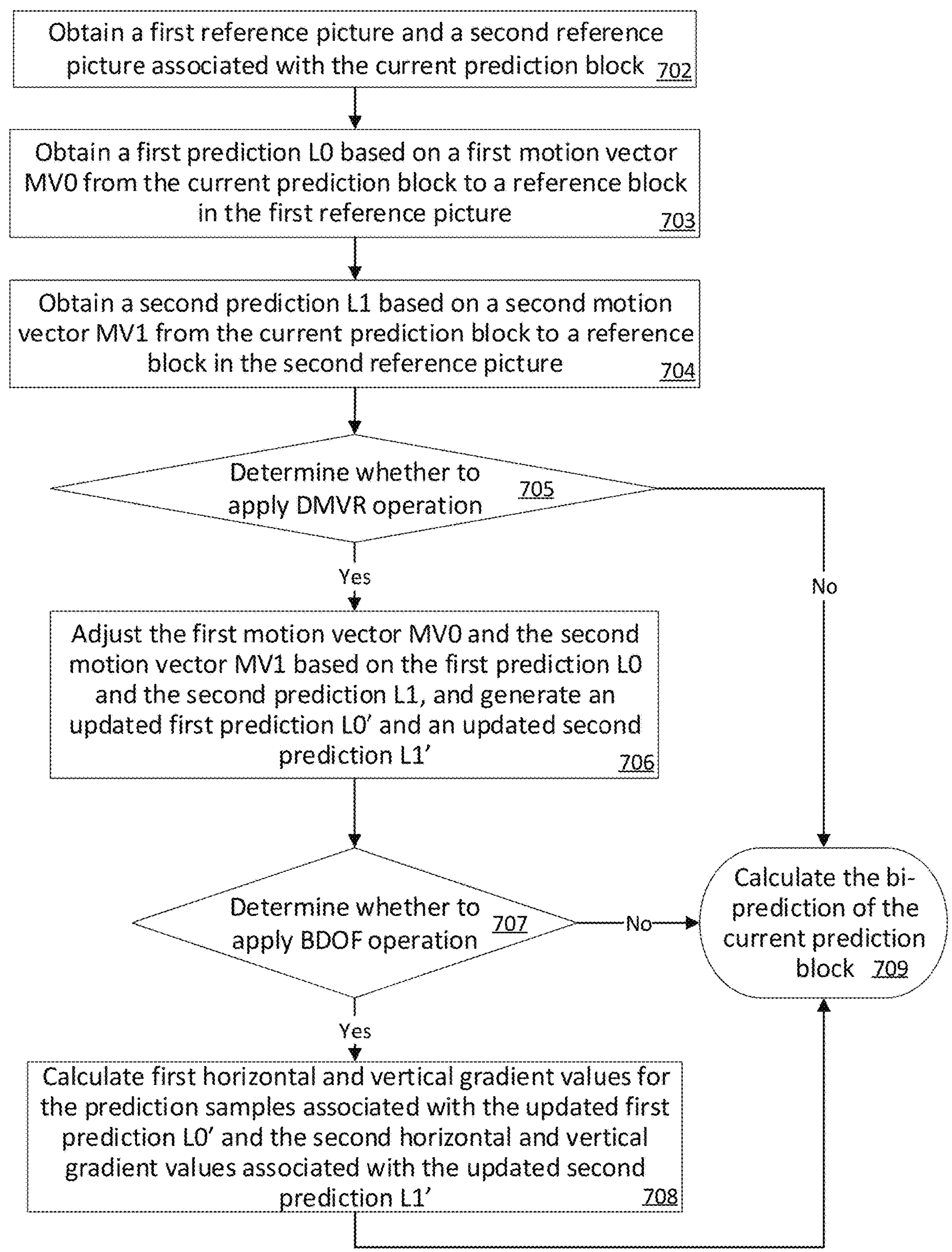
FIG. 7 is a flow chart setting forth an illustrative workflow of selectively bypassing DMVR and BDOF operations in calculating the bi-prediction of a current prediction block.

FIG. 7 is a flow chart setting forth an illustrative workflow of selectively bypassing DMVR and BDOF operations in calculating the bi-prediction of a current prediction block. While processing a current prediction block, a first reference picture and a second reference picture associated with the current prediction block are obtained (702), wherein the first reference picture is before a current picture and the second reference picture is after the current picture in display order. Subsequently, a first prediction L0 is obtained based on a first motion vector MV0 from the current prediction block to a reference block in the first reference picture (703) and a second prediction L1 is obtained based on a second motion vector MV1 from the current prediction block to a reference block in the second reference picture (704). Then a determination is made on whether to apply a DMVR operation (705). If applied, the DMVR operation will adjust the first motion vector MV0 and the second motion vector MV1 based on the first prediction L0 and the second prediction L1, and generate an updated first prediction L0' and an updated second prediction L1' (706). Then a second determination is made on whether to apply a BDOF operation (707). If applied, the BDOF operation will calculate first horizontal and vertical gradient values for the prediction samples associated with the updated first prediction L0' and second horizontal and vertical gradient values associated with the updated second prediction L1' (708). Finally, the bi-prediction of the current prediction block is calculated based on the first prediction L0, the second prediction L1, the optional updated first prediction L0', the optional updated second prediction L1', the optional first horizontal and vertical gradient values, and the optional second horizontal and vertical gradient values (709).

Figure 8:
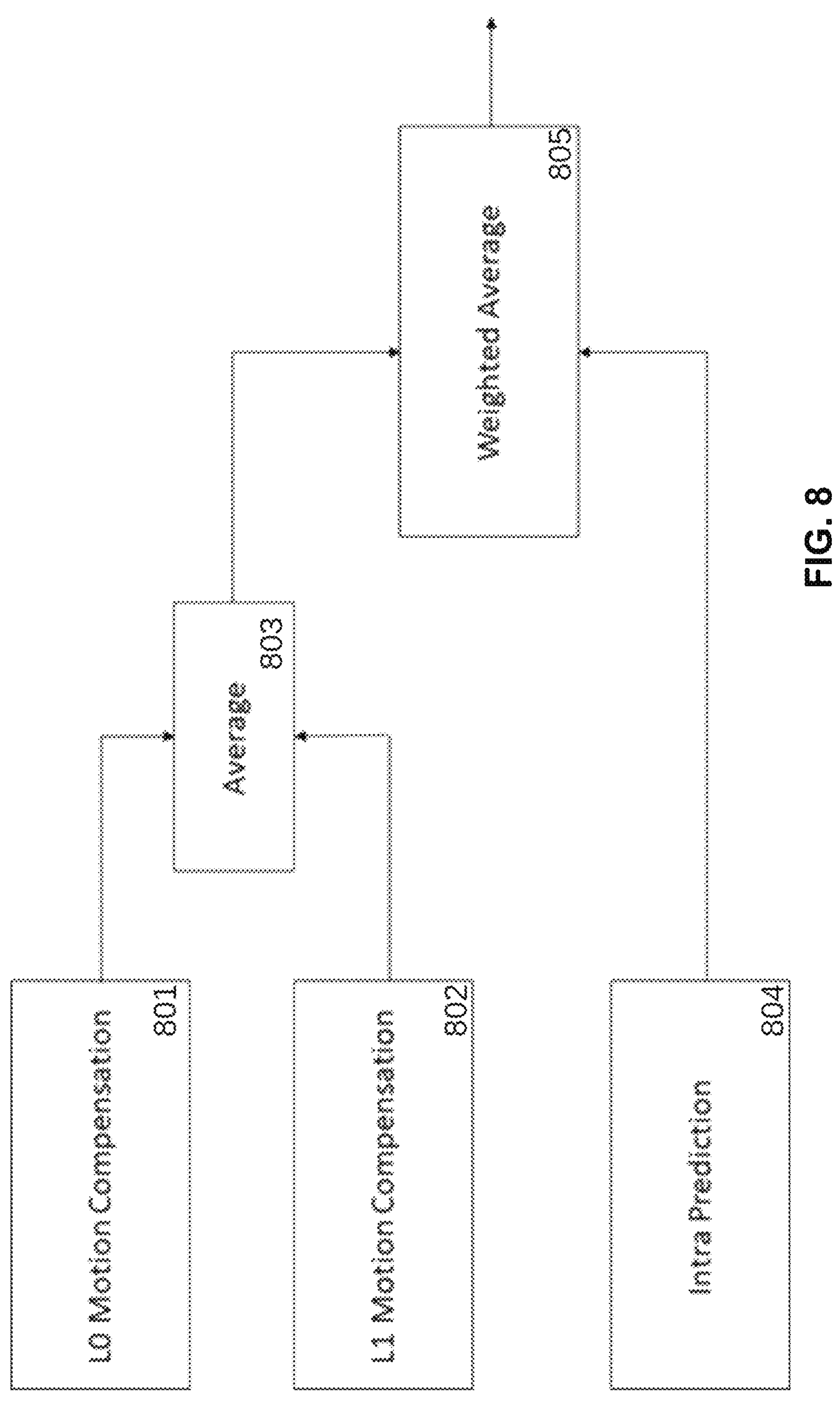
FIG. 8 is a flow chart setting forth an illustrative workflow of a proposed CIIP design in the present disclosure.

In another example, the one or more pre-defined inter-prediction techniques comprises BDOF. FIG. 8 is a flow chart setting forth an illustrative workflow of the CIIP design in this example of the present disclosure. In this workflow, L0 and L1 motion compensations (801 and 802) are averaged (803) instead of being processed through BDOF, and the resulting average is then processed together with the intra prediction (804) to form the weighted average (805) in CIIP mode.

In a third example, the one or more pre-defined inter-prediction techniques comprises DMVR.

According to another embodiment of the present disclosure, the constraining of the application of CIIP mode on the CU based on the determination comprises using a pre-defined criterion to select, from all the available uni-prediction samples, a plurality of uni-prediction samples to be used in the combination with intra-prediction samples for the CU during the application of CIIP mode on the CU when the CU is bi-predicted.

In one example, the pre-defined criterion comprises selecting all the uni-prediction samples based on pictures in the reference picture list 0 (L0).

In another example, the pre-defined criterion comprises selecting all the uni-prediction samples based on pictures in the reference picture list 1 (L1).

Figure 9:
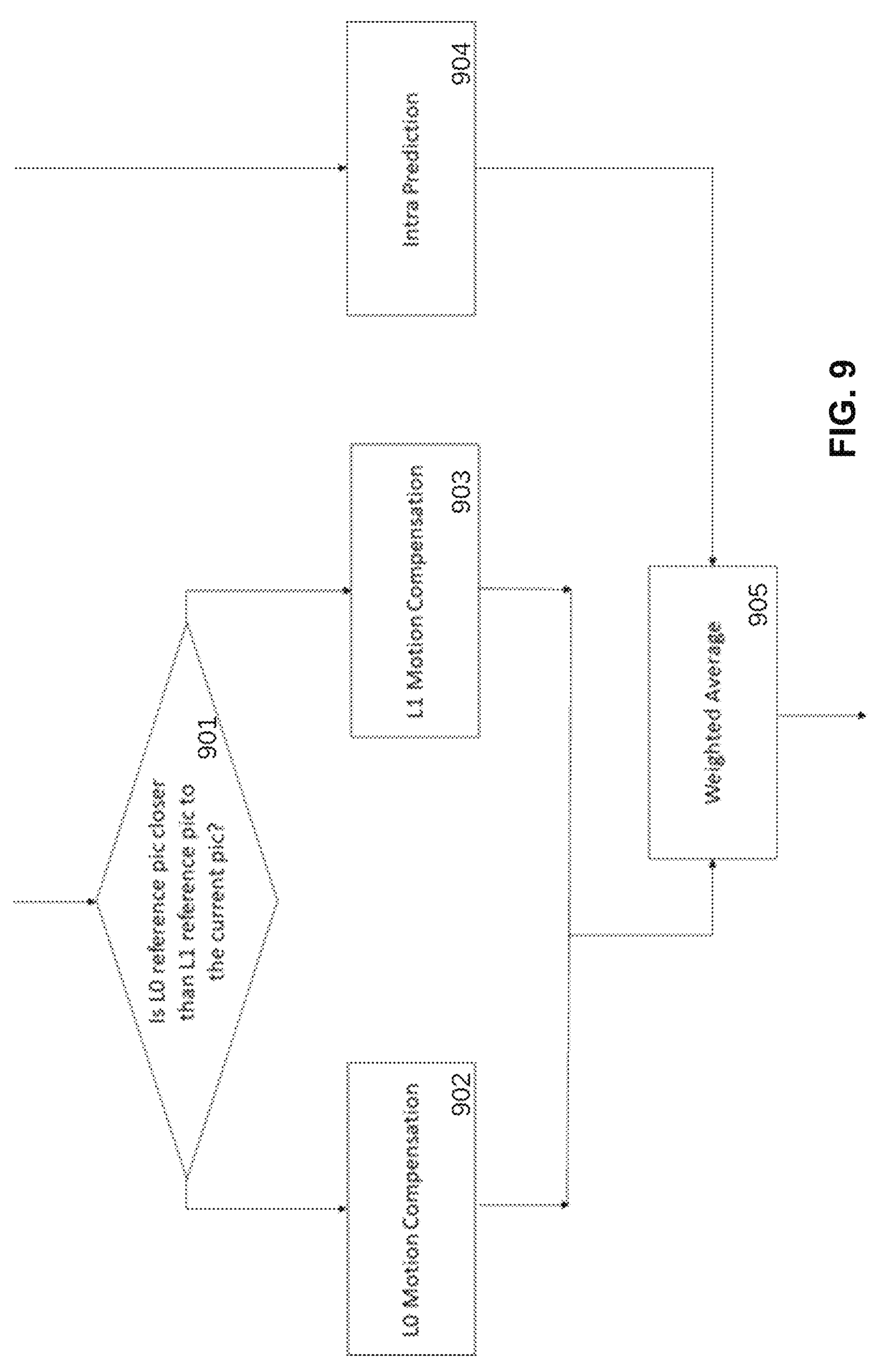
FIG. 9 is a flow chart setting forth an illustrative workflow of a second proposed CIIP design in the present disclosure.

In a third example, the pre-defined criterion comprises selecting all the uni-prediction samples based on the one reference picture that has the smallest picture order count (POC) distance from the picture in which the CU is located (the "current picture"). FIG. 9 is a flow chart setting forth an illustrative workflow of the proposed CIIP design in this example of the present disclosure. In this workflow, a determination is made regarding whether the L0 or L1 reference picture is closer to the current picture in POC distance (901), and the motion compensation from the one reference picture that has the smallest POC distance from the current picture is selected (902 and 903) and then processed together with the intra prediction (904) to form the weighted average (905) in CIIP mode.

According to another embodiment of the present disclosure, the constraining of the application of CIIP mode on the CU based on the determination comprises disabling the application of CIIP mode on the CU and disabling the signaling of CIIP flag for the CU when the CU is bi-predicted. Specifically, to reduce the overhead, the signaling of the CIIP enabling/disabling flag is dependent on the prediction direction of the current CIIP CU. If the current CU is uni-predicted, the CIIP flag will be signaled in bit-stream to indicate whether the CIIP is enabled or disabled. Otherwise (i.e., the current CU is bi-predicted), the signaling of the CIIP flag will be skipped and is always inferred as false, i.e., the CIIP is always disabled.

Also according to the present disclosure, when forming an MPM candidate list for a CU (the "current CU"), a determination will be made regarding whether each CU among the neighboring CUs of the current CU is respectively CIIP-coded, and then for each neighboring CU among the neighboring CUs that is CIIP-coded, a unified criterion that does not depend upon a determination whether the current CU is intra- or CIIP-coded will be employed in the course of using the intra-mode of the neighboring CU in the formation of the MPM candidate list for the current CU.

According to one embodiment of this aspect of the present disclosure, the unified criterion comprises treating the intra-mode of the neighboring CU as unavailable for use in the formation of the MPM candidate list when the neighboring CU is CIIP-coded.

According to another embodiment of this aspect of the present disclosure, the unified criterion comprises treating the CIIP-mode of the neighboring CU as equivalent to an intra-mode in the formation of the MPM candidate list when the neighboring CU is CIIP-coded.

Figures 10A, 10B:
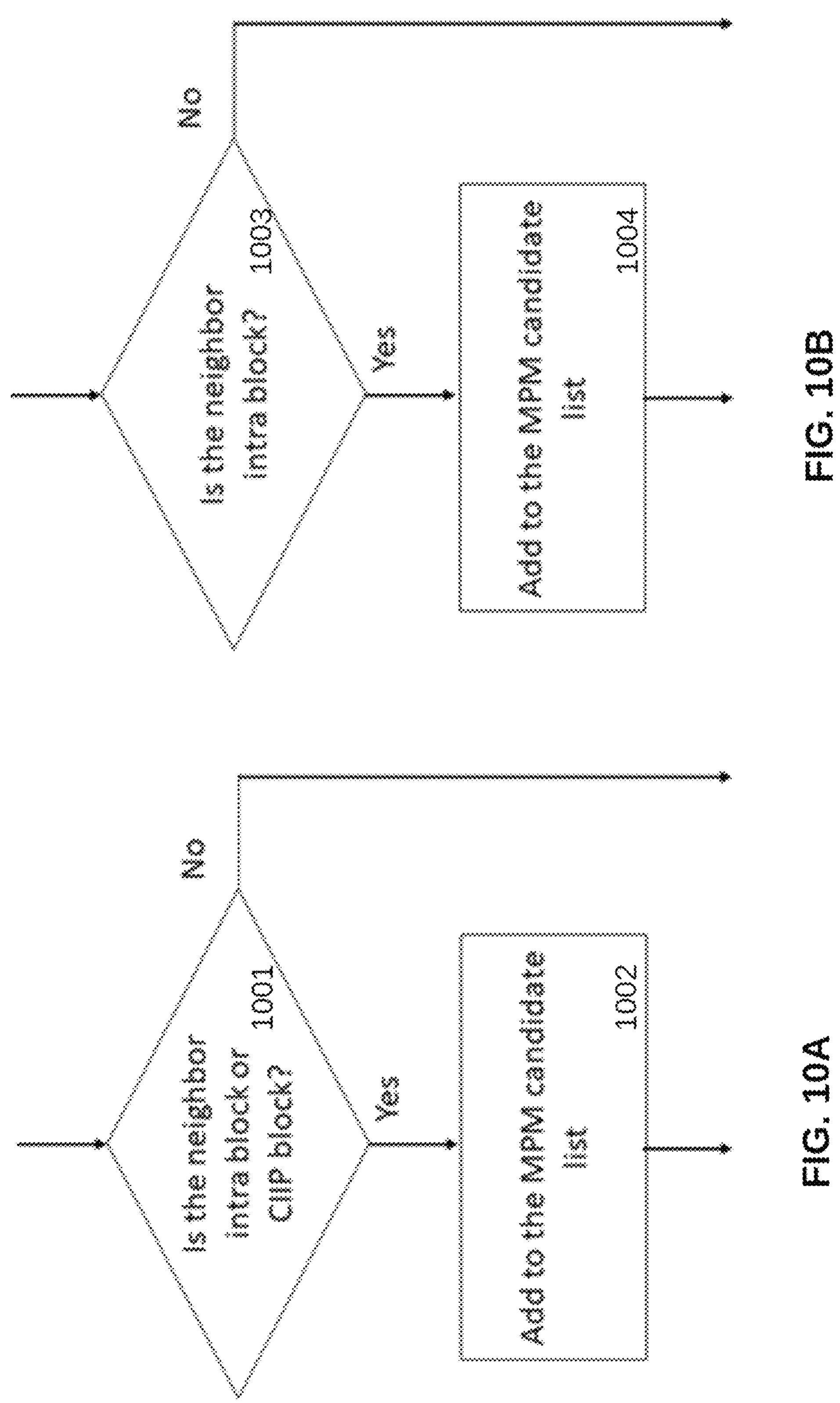
FIGS. 10A-10B constitute a pair of flow charts setting forth an illustrative workflow of two proposed methods of handling CIIP-coded blocks in the generation process for an MPM candidate list in the present disclosure.

FIGS. 10A-10B constitute a pair of flow charts setting forth an illustrative workflow of the two embodiments of this aspect of the present disclosure. FIG. 10A illustrates the workflow of the first embodiment of this aspect of the present disclosure. In this workflow, a determination is first made regarding whether the neighboring CU is an intra block or a CIIP block (1001), and when and only when it is either an intra block or a CIIP block, its intra mode is added to the MPM candidate list of the current CU (1002), regardless whether the current CU is an intra block or a CIIP block. FIG. 10B illustrates the workflow of the second embodiment of this aspect of the present disclosure. In this workflow, a determination is first made regarding whether the neighboring CU is an intra block (1003), and when and only when it is an intra block, its intra mode is added to the MPM candidate list of the current CU (1004), regardless whether the current CU is an intra block or a CIIP block.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

What is claimed is:

1. A method of video encoding, comprising:

obtaining, by an encoder, a first reference picture and a second reference picture associated with a current block, wherein the first reference picture is before a current picture and the second reference picture is after the current picture in display order;

determining, by the encoder, whether to apply a decoder-side motion vector refinement (DMVR) operation based on a combined inter and intra prediction (CIIP) flag for the current block;

determining, by the encoder, whether to apply a bi-directional optical flow (BDOF) operation based on the CIIP flag; and calculating, by the encoder, a prediction of the current block based on the determinations as to whether to apply the DMVR and BDOF operations, wherein when determining to apply the DMVR operation in response to the CHIP flag indicating that CIIP is not applied to the current block, the method further comprises:

adjusting, by the encoder, a first motion vector MV0 and a second motion vector MV1 to generate an updated first prediction L0' and an updated second prediction L1', wherein the first motion vector MV0 is from the current block to a first reference block in the first reference picture, and the second motion vector MV1 is from the current block to a second reference block in the second reference picture, wherein determining whether to apply the BDOF operation comprises:

determining to apply the BDOF operation in response to the CIIP flag indicating that the CIIP is not applied to the current block, and wherein in response to determining to apply the BDOF operation, the method further comprises:

calculating, by the encoder, first horizontal and vertical gradient values associated with the updated first prediction L0'; and calculating, by the encoder, second horizontal and vertical gradient values associated with the updated second prediction L1'.

2. The method of claim 1, wherein determining whether to apply the DMVR operation comprises:

determining not to apply the DMVR operation in response to the CIIP flag indicating that CIIP is applied to the current block.

3. The method of claim 1, wherein determining whether to apply the BDOF operation comprises:

determining not to apply the BDOF operation in response to the CIIP flag indicating that CIIP is applied to the current block.

4. The method of claim 1, wherein calculating the prediction of the current block comprises:

in response to determining not to apply the DMVR and BDOF operations, calculating a bi-prediction of the current block based on a first prediction L0 and a second prediction L1, wherein the first prediction L0 is obtained based on the first motion vector MV0, and the second prediction L1 is obtained based on the second motion vector MV1.

5. The method of claim 1, wherein calculating the prediction of the current block comprises:

calculating a bi-prediction of the current block based on the updated first prediction L0', the updated second prediction L1', the first horizontal and vertical gradient values, and the second horizontal and vertical gradient values.

6. A computing device, comprising:

a storage medium; and one or more processors coupled to the storage medium, wherein the one or more processors are configured to perform acts comprising:

obtaining a first reference picture and a second reference picture associated with a current block, wherein the first reference picture is before a current picture and the second reference picture is after the current picture in display order;

determining whether to apply a decoder-side motion vector refinement (DMVR) operation based on a combined inter and intra prediction (CIIP) flag for the current block;

determining whether to apply a bidirectional optical flow (BDOF) operation based on the CIIP flag; and calculating a prediction of the current block based on the determinations as to whether to apply the DMVR and BDOF operations;

wherein when determining to apply the DMVR operation in response to the CIIP flag indicating that CIIP is not applied to the current block, the acts further comprise:

adjusting a first motion vector MV0 and a second motion vector MV1 to generate an updated first prediction L0' and an updated second prediction L1', wherein the first motion vector MV0 is from the current block to a first reference block in the first reference picture, and wherein the second motion vector MV1 is from the current block to a second reference block in the second reference picture, wherein determining whether to apply the BDOF operation comprises:

determining to apply the BDOF operation in response to the CIIP flag indicating that the CIIP is not applied to the current block, and wherein in response to determining to apply the BDOF operation, the acts further comprise:

calculating first horizontal and vertical gradient values associated with the updated first prediction L0'; and calculating second horizontal and vertical gradient values associated with the updated second prediction L1'.

7. The computing device of claim 6, wherein determining whether to apply the DMVR operation comprises:

determining not to apply the DMVR operation in response to the CIIP flag indicating that CIIP is applied to the current block.

8. The computing device of claim 6, wherein determining whether to apply the BDOF operation comprises:

determining not to apply the BDOF operation in response to the CIIP flag indicating that CIIP is applied to the current block.

9. The computing device of claim 6, wherein calculating the prediction of the current block comprises:

in response to determining not to apply the DMVR and BDOF operations, calculating a bi-prediction of the current block based on a first prediction L0 and a second prediction L1, wherein the first prediction L0 is obtained based on the first motion vector MV0, and the second prediction L1 is obtained based on the second motion vector MV1.

10. The computing device of claim 6, wherein calculating the prediction of the current block comprises:

calculating a bi-prediction of the current block based on the updated first prediction L0', the updated second prediction L1', the first horizontal and vertical gradient values, and the second horizontal and vertical gradient values.

11. A computer readable storage medium storing a bitstream generated by a method of video encoding, wherein the method of video encoding comprises:

obtaining a first reference picture and a second reference picture associated with a current block, wherein the first reference picture is before a current picture and the second reference picture is after the current picture in display order;

determining whether to apply a decoder-side motion vector refinement (DMVR) operation based on a combined inter and intra prediction (CIIP) flag for the current block;

determining whether to apply a bi-directional optical flow (BDOF) operation based on the CIIP flag; and calculating a prediction of the current block based on the determinations as to whether to apply the DMVR and BDOF operations, wherein when determining to apply the DMVR operation in response to the CIIP flag indicating that CIIP is not applied to the current block, the acts further comprises:

adjusting a first motion vector MV0 and a second motion vector MV1 to generate an updated first prediction L0' and an updated second prediction L1', wherein the first motion vector MV0 is from the current block to a first reference block in the first reference picture, and wherein the second motion vector MV1 is from the current block to a second reference block in the second reference picture, wherein determining whether to apply the BDOF operation comprises:

determining to apply the BDOF operation in response to the CIIP flag indicating that the CIIP is not applied to the current block, and wherein in response to determining to apply the BDOF operation, the method further comprises:

calculating first horizontal and vertical gradient values associated with the updated first prediction L0'; and calculating second horizontal and vertical gradient values associated with the updated second prediction L1'.

* * * * *